(12) United States Patent
Luebbers et al.

(10) Patent No.: US 9,175,786 B2
(45) Date of Patent: Nov. 3, 2015

(54) VALVE APPARATUS

(71) Applicant: LUMEC CONTROL PRODUCTS, INC., Peoria, IL (US)

(72) Inventors: Paul R. Luebbers, Dunlap, IL (US); Eric J. McMasters, Mapleton, IL (US)

(73) Assignee: LUMEC CONTROL PRODUCTS, INC., Peoria, IL (US)

( * ) Notice: Subject to any disclaimer, the term of this patent is extended or adjusted under 35 U.S.C. 154(b) by 173 days.

(21) Appl. No.: 14/015,628

(22) Filed: Aug. 30, 2013

(65) Prior Publication Data
US 2015/0060713 A1 Mar. 5, 2015

(51) Int. Cl.
*F16K 3/03* (2006.01)
*F16K 31/53* (2006.01)

(52) U.S. Cl.
CPC ............. *F16K 31/535* (2013.01); *F16K 3/03* (2013.01)

(58) Field of Classification Search
CPC ......... F16K 3/03; F16K 31/04; F16K 31/508; F16K 37/0083; F16K 37/0091
USPC ........................... 251/129.11, 212, 249.5, 266
See application file for complete search history.

(56) References Cited

U.S. PATENT DOCUMENTS

| | | | |
|---|---|---|---|
| 1,595,300 A | 8/1926 | Halloran | |
| 2,588,161 A | 3/1952 | Probst | |
| 2,830,617 A * | 4/1958 | Brown | 137/553 |
| 2,926,920 A | 3/1960 | Lorenz | |
| 3,101,736 A * | 8/1963 | Egger | 137/242 |
| 3,175,765 A | 3/1965 | Stranak | |
| 3,787,022 A | 1/1974 | Wilcox | |
| 4,023,280 A | 5/1977 | Schora et al. | |
| 4,026,321 A | 5/1977 | Kahoe et al. | |
| 4,040,403 A | 8/1977 | Rose et al. | |
| 4,094,492 A | 6/1978 | Beeman et al. | |
| 4,232,595 A | 11/1980 | Cox | |
| 4,353,500 A | 10/1982 | Brown | |
| 4,375,950 A | 3/1983 | Durley, III | |
| 4,383,550 A | 5/1983 | Sotokazu | |
| 4,438,705 A | 3/1984 | Basic, Sr. | |
| 4,516,510 A | 5/1985 | Basic, Sr. | |
| 4,628,830 A | 12/1986 | Koziak | |
| 4,790,194 A | 12/1988 | Bellows et al. | |
| 5,190,068 A | 3/1993 | Philbin | |
| 5,238,398 A | 8/1993 | Harris | |
| 5,331,995 A | 7/1994 | Westfall et al. | |

(Continued)

FOREIGN PATENT DOCUMENTS

| | | |
|---|---|---|
| WO | WO9728390 | 8/1997 |
| WO | WO9947839 | 9/1999 |

(Continued)

OTHER PUBLICATIONS

Search Report and Written Opinion issued in Int'l App. No. PCT/US2014/044407 (2014).

*Primary Examiner* — Matthew W Jellett
(74) *Attorney, Agent, or Firm* — Barnes & Thornburg LLP

(57) ABSTRACT

A valve apparatus for a fluid transmission line. The valve apparatus comprising a housing; a drive mechanism; a leadscrew selectively rotatable in a first or second rotational leadscrew direction by the drive mechanism; a drive gear mounted to the housing, the drive gear configured to be selectively driven in a first or second drive gear direction during rotation of said leadscrew in the first or second leadscrew direction to operate an iris mechanism.

18 Claims, 7 Drawing Sheets

(56) References Cited

U.S. PATENT DOCUMENTS

| | | |
|---|---|---|
| 5,449,141 A | 9/1995 | Gillett et al. |
| 5,829,464 A | 11/1998 | Aalto et al. |
| 5,938,175 A | 8/1999 | Young et al. |
| 5,975,493 A | 11/1999 | Ellingson et al. |
| 6,009,899 A | 1/2000 | Polutnik |
| 6,221,091 B1 | 4/2001 | Khosravi |
| 6,271,486 B1 * | 8/2001 | Franklin et al. ............... 177/105 |
| 6,375,155 B1 | 4/2002 | Janssens |
| 6,439,944 B1 | 8/2002 | La Fata |
| 6,564,824 B2 | 5/2003 | Lowery et al. |
| 6,564,825 B2 | 5/2003 | Lowery et al. |
| 6,588,455 B1 | 7/2003 | Welfare |
| 6,605,176 B2 | 8/2003 | Tzu |
| 6,872,013 B2 | 3/2005 | Guy |
| 6,896,240 B2 | 5/2005 | Wijaya |
| 6,955,535 B2 | 10/2005 | Diebold |
| 7,114,404 B2 | 10/2006 | Sandhu et al. |
| 7,143,743 B2 | 12/2006 | Uda et al. |
| 7,255,012 B2 | 8/2007 | Hedtke |
| 7,666,180 B2 | 2/2010 | Holsten et al. |
| 8,132,783 B2 | 3/2012 | Luebbers |
| 8,215,613 B2 * | 7/2012 | Cheung ........................ 251/212 |
| 2007/0034264 A1 | 2/2007 | Kunz et al. |
| 2007/0119349 A1 | 5/2007 | Widmer et al. |
| 2007/0119351 A1 | 5/2007 | Widmer et al. |
| 2008/0182214 A1 | 7/2008 | Cox et al. |
| 2009/0114861 A1 | 5/2009 | Luebbers et al. |

FOREIGN PATENT DOCUMENTS

| | | |
|---|---|---|
| WO | WO2006060185 | 6/2006 |
| WO | WO2009035845 | 3/2009 |

* cited by examiner

VALVE APPARATUS

BACKGROUND AND SUMMARY

The present disclosure relates generally to a valve apparatus for natural gas flow and other gas and fluid flow.

The flow of the gases and other fluids piped through lines is controlled with valves. U.S. Pat. No. 8,132,783 discloses a valve apparatus that can be used for such purposes. It is often difficult to protect the mechanical arrangement by which the iris mechanism control element is mechanically adjusted as well as the mechanism which is used to reduce the drive motor revolutions to a single revolution so that it may be used to limit the travel of the control element.

The present disclosure relates to a valve apparatus for a fluid transmission line. The valve apparatus comprises: a housing; a drive mechanism; a leadscrew selectively rotatable in a first or second rotational leadscrew direction by the drive mechanism; a drive gear mounted to the housing, the drive gear configured to be selectively rotatable in a first or second drive gear direction during rotation of said leadscrew in the first or second leadscrew direction, said drive gear defining a throughhole; a plurality of leaves disposed about said throughhole, each of said leaves including a curvilinear portion and a pair of ends and being pivotally or otherwise mounted to the drive gear, and each of said leaves being oriented to extend radially inward into said throughhole to define an orifice; and a plurality of engagement members biasing said leaves to reduce the orifice when said drive gear rotates in said first drive gear direction and to increase the orifice when said drive gear rotates in said second drive gear direction to adjust a volume of transmission of fluid therethrough. The housing may define a bore, the leadscrew, and the drive gear housed substantially within the bore.

The valve apparatus may further comprise a fastener threadingly or otherwise engaged with the leadscrew and engage with the drive gear for transferring torque from the leadscrew to the drive gear during rotation of the leadscrew. The fastener travels along a length of the leadscrew during rotation of the leadscrew. The valve apparatus may further comprise a stationary shaft adjacent the leadscrew, the fastener slidably engaged with the shaft for balancing the torque transferred from the leadscrew to the fastener. The valve apparatus may further include a lever arm engaging the fastener and the drive gear. The valve apparatus may further include a bushing engaging the fastener and the lever arm. The lever arm may include two parallel arms, each of which is operatively associated with the bushing.

The drive mechanism of the valve apparatus includes a motor operatively associated with the leadscrew for selectively rotating the leadscrew in the first or second leadscrew direction. The drive mechanism may also include a planetary gear transmission operatively associated with the motor. The planetary gear transmission comprises a central sun gear, a plurality of planetary gears, and a ring gear. The housing may define a bore and include a casing defining a cavity, the motor and the planetary gear transmission housed substantially within the cavity.

Features and advantages of the disclosure will be set forth in part in the description which follows and the accompanying drawings described below, wherein an embodiment of the disclosure is described and shown, and in part will become apparent upon examination of the following detailed description taken in conjunction with the accompanying drawings.

BRIEF DESCRIPTION OF THE DRAWINGS

The present invention will become more fully understood from the detailed description and the accompanying drawings, wherein.

DETAILED DESCRIPTION

Figure 1:
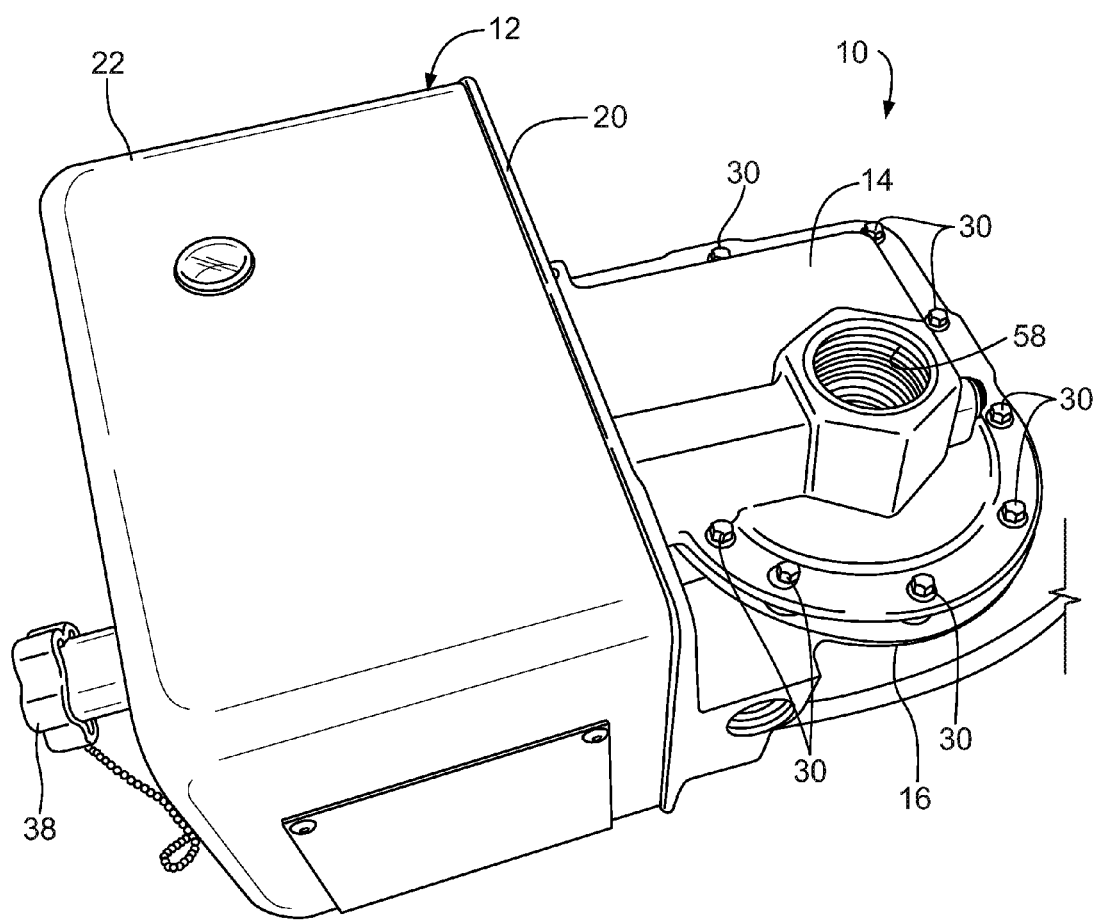
FIG. 1 is a perspective of a valve apparatus in accordance with an illustrated embodiment of the present disclosure.
Figure 2:
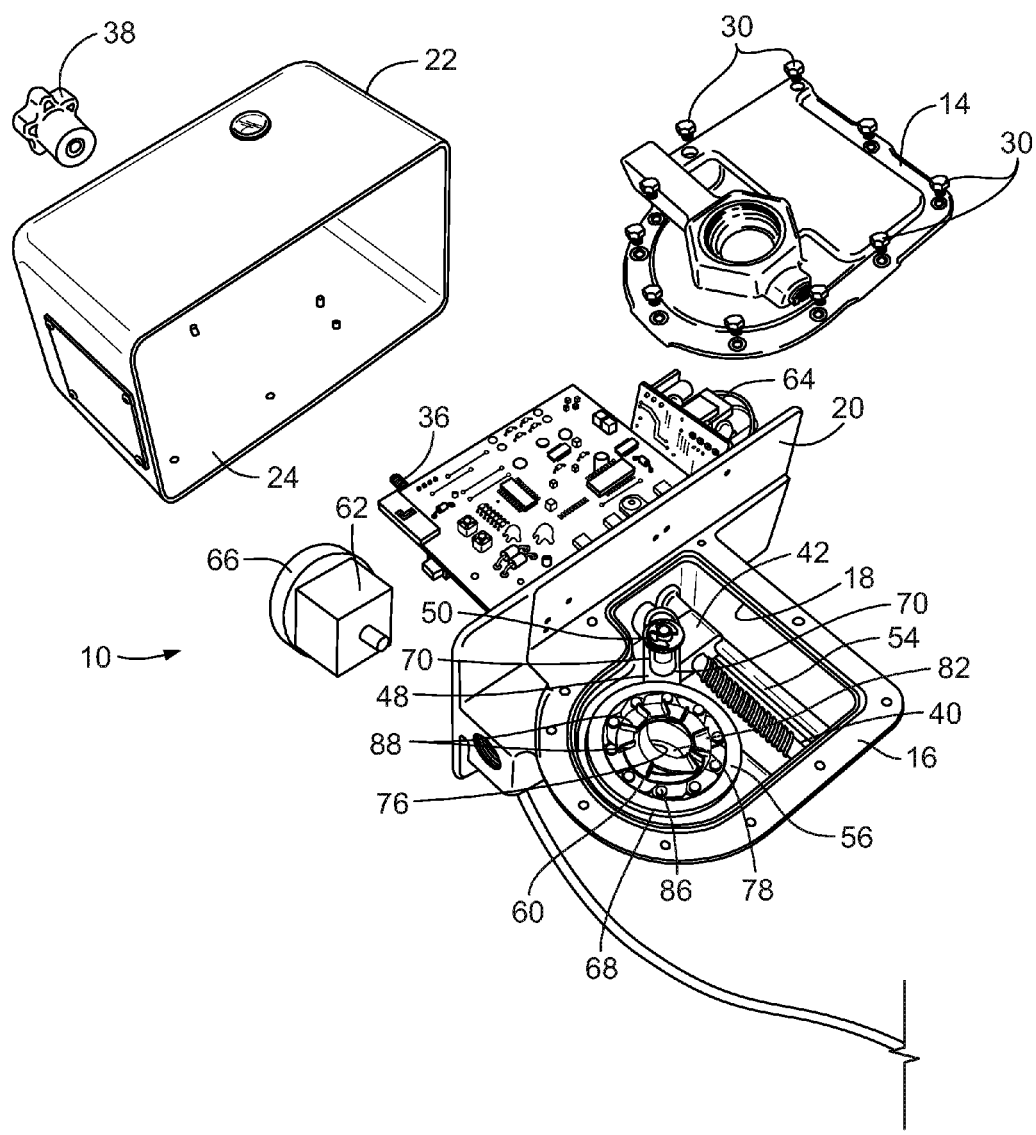
FIG. 2 is an exploded view of the valve apparatus of FIG. 1.
Figure 3:
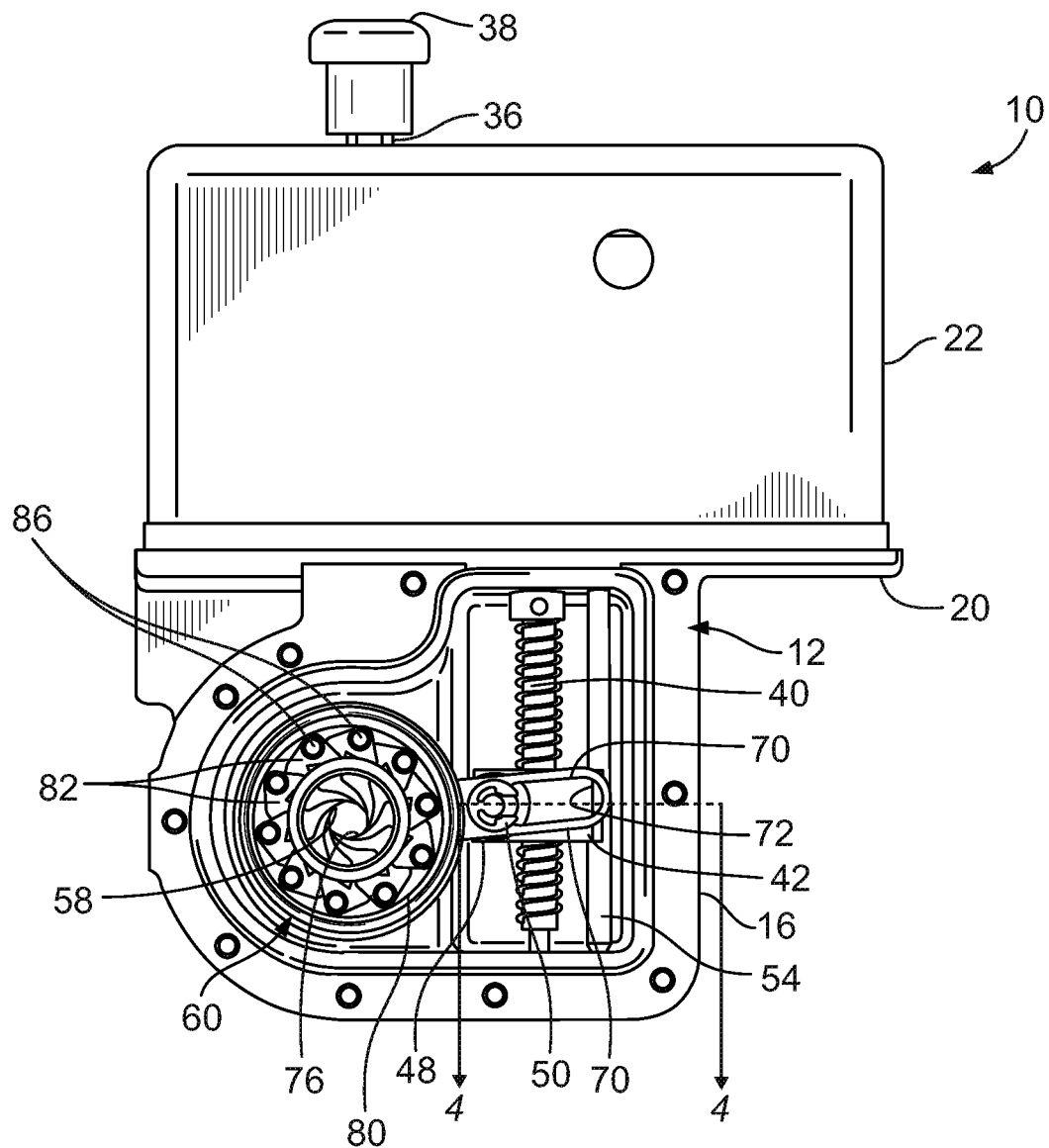
FIG. 3 is a side plan view of the housing and valve apparatus of FIG. 1 with a section of the housing removed to illustrate the drive mechanism, the threaded shaft and the balancing shaft of the valve apparatus.
Figure 4:
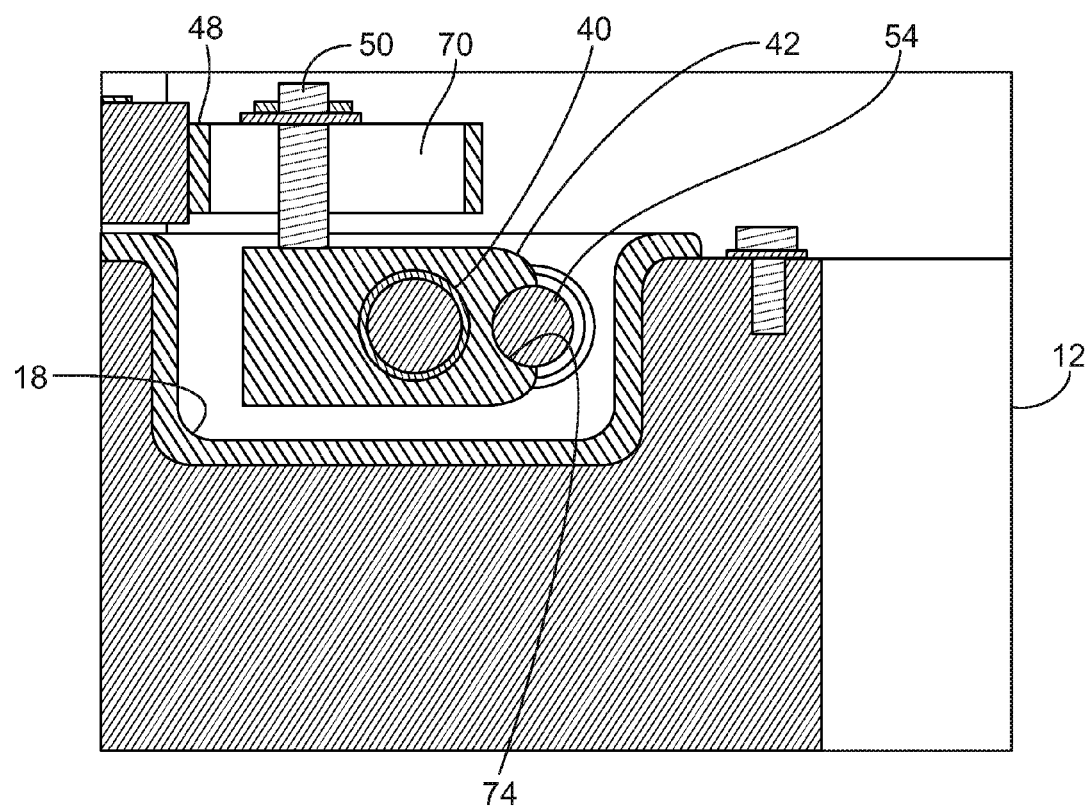
FIG. 4 is a cross-section taken along lines 4-4 of FIG. 3.
Figure 5:
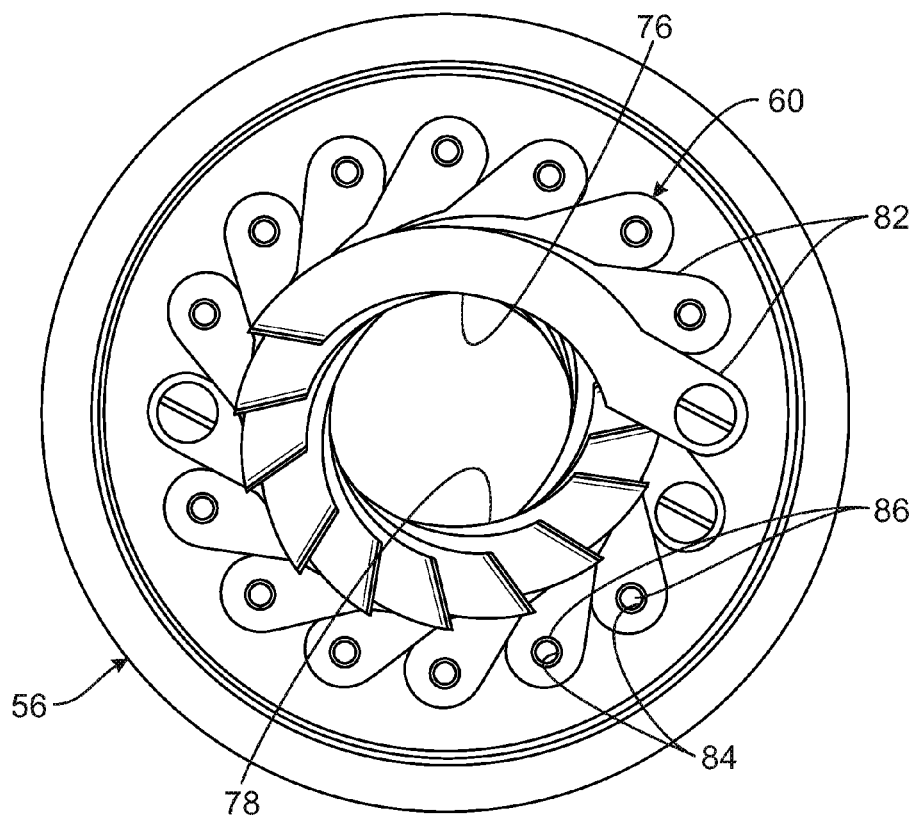
FIG. 5 is a cutaway side view of the drive gear and the iris mechanism of the valve apparatus of FIG. 1.
Figure 6:
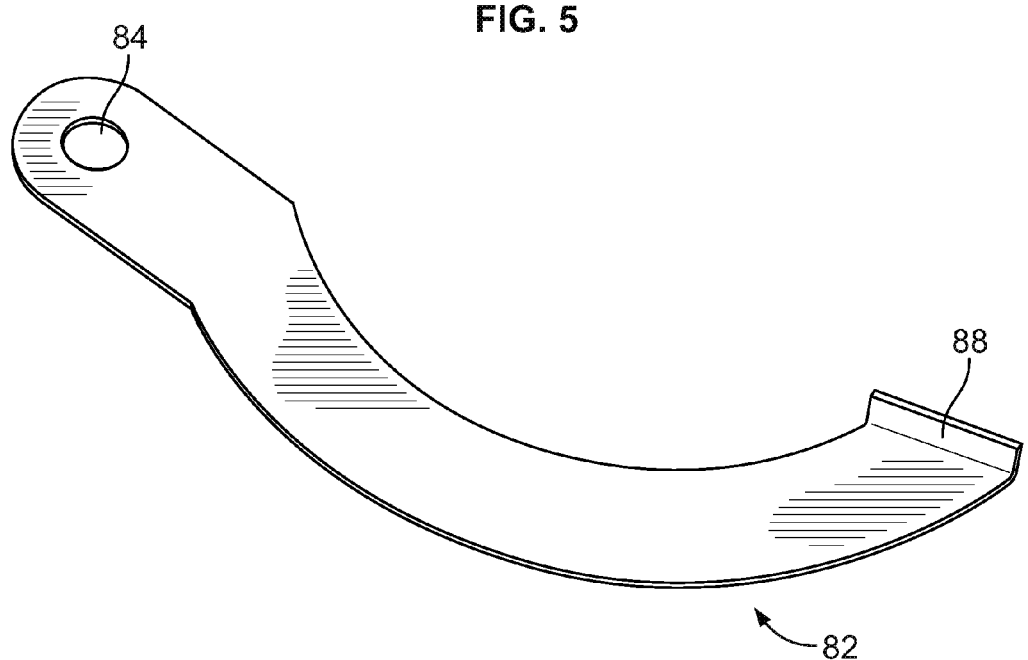
FIG. 6 is an isometric view of a single leaf of the iris mechanism of the valve apparatus of FIG. 1.

While the present disclosure may be susceptible to embodiments in different forms, there is shown in the drawings and slides, and will be described herein in additional detail, one or more embodiments with the understanding that the present description is to be considered an exemplification of the principles of the disclosure and is not intended to be exhaustive or to limit the disclosure to the details of construction and the arrangements of components set forth in the following description or illustrated in the drawings and slides.

FIGS. 1-8 illustrate a valve apparatus 10 in accordance with an illustrated embodiment of the present disclosure generally including a housing 12. The housing 12 includes a pair of housing sections 14, 16 defining a bore 18, a housing plate 20, and a motor casing 22 defining a cavity 24. The housing sections 14, 16 are secured together by a plurality of fasteners 30 or in any other suitable manner. The motor casing 22 is secured by a nut knob 38 to a threaded shaft 36 secured to the housing plate 20 of the housing 12 or may be secured in any other suitable manner. The valve apparatus 10 may include a power cord. The housing 12 may have any other suitable construction and configuration in accordance with other embodiments of the present disclosure.

The illustrated valve apparatus 10 further includes a threaded leadscrew 40, a fastener 42 threadingly engaged with the leadscrew 40, a lever arm 48, a bushing 50 engaging the fastener and the lever arm, a stationary shaft 54, a drive gear 56, and an iris mechanism 60, all of which are housed substantially within the bore 18 of the housing 12. The valve apparatus 10 also includes a motor 62, electrical circuitry 64, a planetary gear transmission 66 and electronics associated with the motor housed substantially within the cavity 24 of the casing 22. The motor 62 and planetary gear transmission 66 are configured to selectively drive the leadscrew 40 in either rotational direction to drive the drive gear 56 and operate the iris mechanism 60. The fastener 42, the lever arm 48 and the bushing 50 are configured to transfer torque from the leadscrew 40 to the drive gear 56 to operate the iris mechanism 60.

The leadscrew 40 is rotationally mounted to the housing plate 20 of the housing and is drivably engaged with the motor 62. The stationary shaft 54 is adjacent and parallel to the leadscrew 40. The stationary shaft 54 is rigidly mounted to the housing plate 20. The fastener 42 is threadingly engaged with the leadscrew 40 and is engaged with the lever arm 48 by the bushing 50 or may be engaged with the drive gear 56 in any other suitable manner. In the illustrated embodiment, the lever arm 48 includes a pair of parallel arms 70 that define a slot 72 that slidably receives the bushing 50. The fastener 42 has a rectangular construction and defines a semicircular bore 74 for slidably engaging the stationary shaft 54 so that the torque transferred from the leadscrew 40 to the fastener is balanced. Rotation of the leadscrew 40 causes the fastener 42 to travel along a length of the leadscrew in either direction depending upon the direction of rotation of the leadscrew. This travel causes the lever arm 48 to operate the drive gear 56 and the iris mechanism 60.

The housing 12 defines a lumen 58, the drive gear 56 defines a throughhole 78 and the housing and the iris mechanism 60 define an orifice 76. The lumen 58, the orifice 76, and the throughhole 78 are concentric. The iris mechanism 60 includes a plurality of leaves 82. The drive gear 56 may be in the form of a ring. The lever arm 48 extends from the leadscrew 40 to the drive gear 56.

Each of the illustrated leaves 82 has a substantially flat, curvilinear portion. A first end of each leaf has a pin hole 84 for receiving a pin 86 for mounting the leaf 82 to the drive gear in a pivoting manner. The second end of leaf 82 terminates in a fin or flange 88. In the illustrated embodiment, the fin 88 is substantially perpendicular to the plane of the curvilinear portion. The flange 88 may be at an angle to the curvilinear portion of the leaf within a range of substantially about 90 degrees to substantially about 135 degrees. The use of flange 88 may facilitate overlapping leaves, including multiple overlaps, that is, more than two leaves overlapping one another relative to the longitudinal axis of the valve apparatus. This feature may facilitate use in high pressure applications as well as other more abusive environmental conditions, such as high temperature or corrosive fluid flow, and promotes tighter sealing. Portions of the leaves, such as its curvilinear portion, may be flared, twisted, torqued or otherwise non-planar to further promote a sealing engagement with neighboring leaves.

The leaves 82 may be made from any suitable materials, and arranged so that each leaf is a different material than the adjacent leaf. Physical forces, such as magnetism, or an integral torsion in each leaf, may bond the leaves together while allowing them to slide relative to each other. The leaves 82 may have any other suitable configuration in accordance with other embodiments of the present disclosure.

In assembly, each leaf 82 is pinned to the drive gear 56 by a respective pin 86 or may be secured to the drive gear 56 in any other suitable manner. The fin 88 projects axially downstream in the illustrated embodiment. A bushing or extension 68 engages an O-ring associated with housing section 14. The bushing 68 fixedly locks into the housing to prevent rotation. Fins 88 engage a protruding ring having thin slots to engage the fins. Another ring may provide a sealing surface.

In the illustrated embodiment, when assembled, each pin is substantially equidistant radially to a center axis of the through hole 78 and orifice 76. The slots of the protruding ring are also substantially equidistant radially, and substantially equally spaced circumferentially in the depicted embodiment. Each fin 88 is also substantially linear in the illustrated embodiment. The assembled components of leaves 82, the protruding ring and drive gear 56 are thereafter further installed with an O-ring into a recess of the housing. Bushing 68 may be fixedly attached to the housing section 14 by means of a key and slot, boss and detent, snap fit, screws or any other suitable means. Another ring may provide a sealing surface.

The drive gear 56 and iris mechanism 60, may have any other suitable construction or configuration or may be secured or engaged in any other manner in accordance with other embodiments of the present disclosure. Additionally, the leadscrew 40, the lever arm 48 and the bushing 50 may be engaged or otherwise associated with each other and the drive gear 56 in any other suitable manner in accordance with other embodiments of the present disclosure.

The iris mechanism 60 may, for example, be similar to the iris member disclosed in U.S. Pat. No. 8,132,783. In the illustrated embodiment, when assembled, each pin is substantially equidistant radially to the center axis of the throughhole 78 and orifice 76 of the valve apparatus. Slots are also substantially equidistant radially, and substantially equally spaced circumferentially in the illustrated embodiment. Each fin 88 is also substantially linear in the illustrated embodiment. The assembled components of leaves 82, protruding ring and drive gear 56 may be installed with an O-ring or the like. The protruding ring is fixedly attached to housing section 14 by means of a key and slot, boss and detent, snap fit, screws or in any other suitable manner. The motor 64 and housing section 14 are thereafter installed with housing section 16 encapsulating the components. This iris mechanism may have any other construction and configuration in accordance with other embodiments of the present disclosure.

Figure 7:
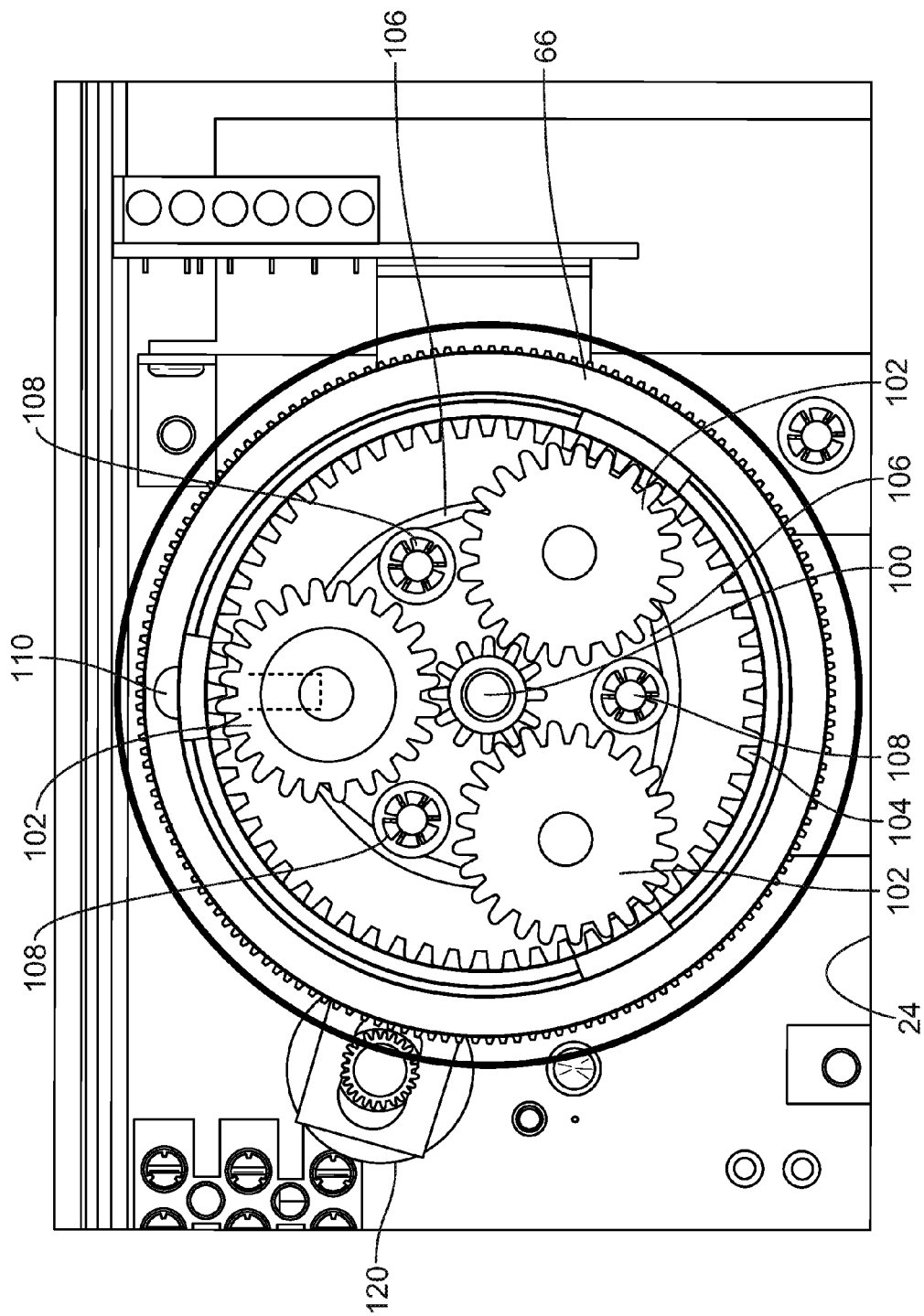
FIG. 7 is a top plan view of the planetary gear transmission of FIG. 7 with one of the plates removed to illustrate the planetary and sun gears.
Figure 8:
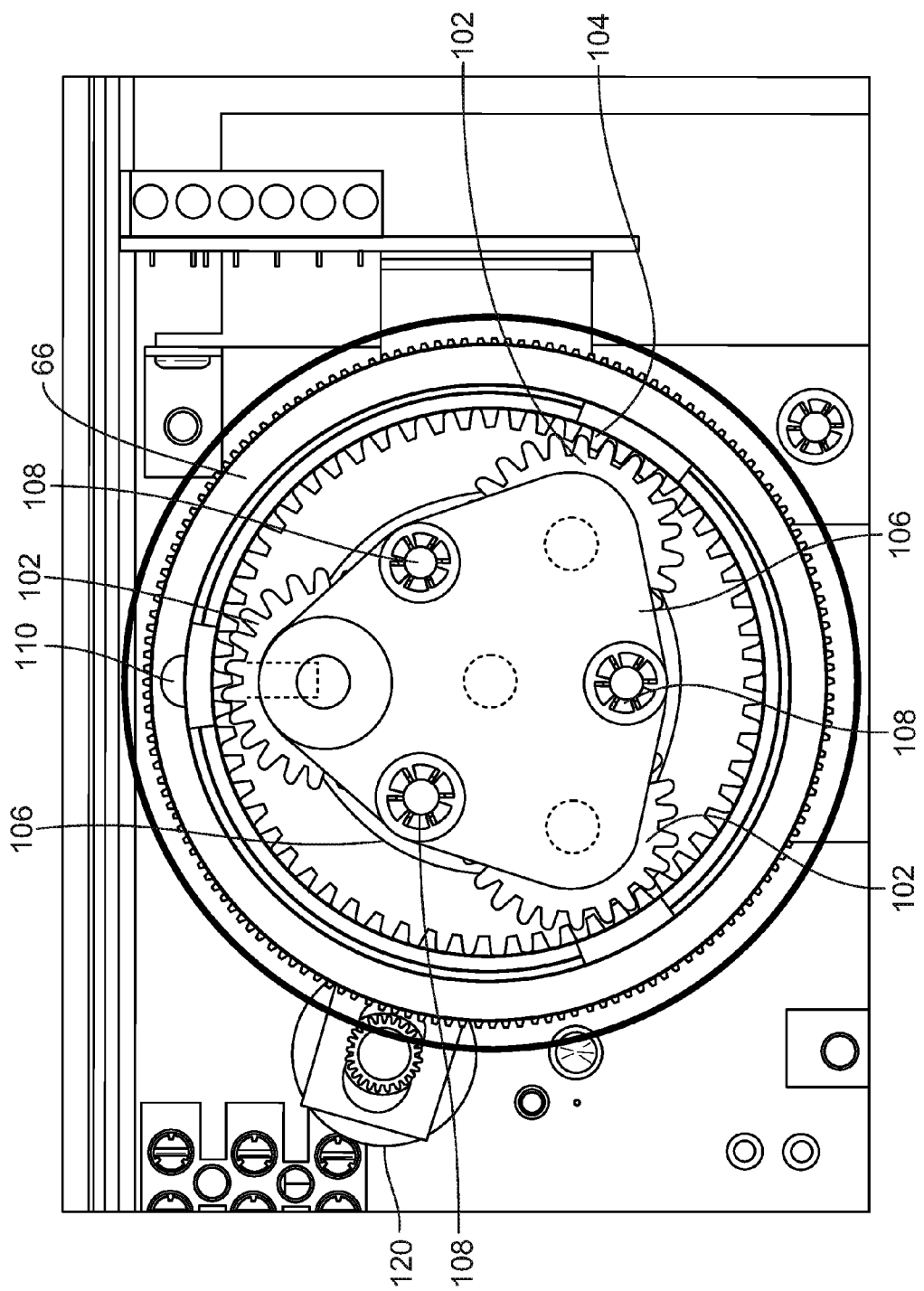
FIG. 8 is a top plan view of the valve apparatus of FIG. 1 with the motor casing removed illustrating the sun and ring gears of the planetary gear transmission.

The illustrated planetary gear transmission 66 includes a central sun gear 100, three planetary gears 102, and a ring gear 104 which is operatively engaged with the motor 62 for driving the ring gear. The planetary gear transmission 66 includes a plate arrangement including a pair of plates 106 sandwiched about the gear transmission 66 and a plurality of shafts 108 that interconnect the plates. The plate arrangement is engaged with the motor 62 and provides a placement for the planetary gears 102 to operatively engage the sun gear 100 and the ring gear 104. A nonmetallic band is operatively engaged with the ring gear 104 and operatively engages with a switch for disabling the action of the motor 62. FIGS. 7 and 8 also include a position encoder 120 for determining the size of the orifice 76.

In operation, the motor 62 activates the planetary gear transmission 66 in response to either automatic control or user selection. The protruding ring does not rotate. This causes rotation of the threaded leadscrew 40 which causes the fastener 42 to travel along the leadscrew and slide along the shaft 54, and causes the drive gear 56 to rotate. As the drive gear 56 rotates, the second inner end of each leaf 82 is held fixed against circumferential displacement by engagement of the fin 88 with its corresponding slot of fixed protruding ring. As the drive gear 56 rotates, it circumferentially turns the outer end of each leaf 82. Each leaf 82 rotates around its pin hole 84. Accordingly, traction on each leaf 82 through pin 86 by drive gear 56 causes each leaf to advance radially inward. As drive gear 56 is driven in a first direction, each of the plurality of leaves moves inward to reduce the orifice 76 by reducing its diameter or otherwise reducing its size. An inside edge 102 each leaf advances in a manner reducing the distance between the inner edge 102 of the leaf and a center axis of orifice 76. Accordingly, the orifice 76 becomes smaller to reduce the volume of fluid or gas to pass therethrough or to close completely.

To increase the orifice 76 and allow a larger volume of fluid or gas to pass therethrough, the motor 62 is driven in an opposite direction. Each leaf is thereby driven by its pin hole 84 against the slot of the protruding ring. Engagement of each fin 88 against the slot causes the leaf to move radially outward from the center axis of the orifice 76, thereby opening it. Accordingly, any suitable dual polarity motor or other suitable motor may provide driving force in each of two directions in order to selectively adjust the orifice 76 through which fluid or gas flows.

In the illustrated embodiment, the orifice 76 is substantially circular. The iris mechanism 60 type configuration illustrated provides for the orifice 76 to remain symmetrical, and as illustrated substantially centered on the valve apparatus axis throughout variations in its size or variations in the flow volume through it. As such, the valve apparatus provides a mathematically predictable proportion between orifice size and flow volume. Because the orifice 76 is centered on the lumen 58 defined by the housing and geometrically symmetrical, the flow of fluid or gas through it is proportional to the opening or closing of the orifice 76. Accordingly, a more precise control of flow may be achieved. Laminar flow of fluid is re-established immediately after the orifice is increased or decreased and may be established within the lumen of the valve apparatus itself, minimizing turbulence as the fluid exits the valve apparatus.

The electrical control interface consists of multiple functional components. In one embodiment the main control interface consists of a sealed multi-pin plug. This plug may be wired to a printed circuit board. The PCB contains any suitable circuitry which allow for switching of the polarity of the input drive signal. The PCB also contains limit switches that indicate the valve apparatus position sensed from a mechanical positioning device attached to the secondary output shaft. The PCB may also contain limit switches which detect (as by cam 110) and control the travel limits of the drive system which can be positioned by a user. Cam 110 is driven by planetary gear transmission 66. In one embodiment, a secondary PCB is wired to the primary PCB. The secondary PCB contains electronic control architecture which allows the reception, interpretation, and use of one of several standard control signals, such as 4-20 mA, 0-10 Vdc, etc. for valve apparatus position. The entire electronic control package may be physically contained within the motor casing. There may be a seal between the motor casing and the housing plate 20. There may also be indicators, which may be mechanical or electrical, on the housing 12 which relay status of the valve apparatus position. Any other suitable electronics may be included in accordance with other embodiments of the present disclosure.

While embodiments have been illustrated and described in the drawings and foregoing description, such illustrations and descriptions are considered to be exemplary and not restrictive in character, it being understood that only illustrative embodiments have been shown and described and that all changes and modifications that come within the spirit of the disclosure are desired to be protected. The description and figures are intended as illustrations of embodiments of the disclosure, and are not intended to be construed as having or implying limitation of the disclosure to those embodiments. There are a plurality of advantages of the present disclosure arising from various features set forth in the description. It will be noted that alternative embodiments of the disclosure may not include all of the features described yet still benefit from at least some of the advantages of such features. Those of ordinary skill in the art may readily devise their own implementations of the disclosure and associated methods, without undue experimentation, that incorporate one or more of the features of the disclosure and fall within the spirit and scope of the present disclosure and the appended claims.

The invention claimed is:

1. A valve apparatus for a fluid transmission line, the valve apparatus comprising:
   a housing;
   a drive mechanism;
   a leadscrew selectively rotatable by the drive mechanism in a first or second leadscrew direction;
   a drive gear mounted to the housing, the drive gear configured to be selectively rotatable in a first or second drive gear direction during rotation of said leadscrew in the first or second leadscrew direction, the drive gear defining a throughhole;
   a plurality of leaves disposed about the throughhole, each of said leaves including a curvilinear portion and a pair of ends and being mounted to the drive gear adjacent one of said ends, and each of said leaves being oriented to extend radially inward into said throughhole to define an orifice;
   a plurality of engagement members biasing said leaves to reduce the orifice when the drive gear rotates in said first drive gear direction and to increase the orifice when the drive gear rotates in said second drive gear direction to adjust a volume of transmission of fluid therethrough; and
   a stationary shaft adjacent and extending parallel to the leadscrew, the fastener slidably engaged and in contact with the shaft for balancing the torque transferred from the leadscrew to the fastener.

2. The valve apparatus of claim 1 further comprising a fastener engaged with the leadscrew and with the drive gear for transferring torque from the leadscrew to the drive gear during rotation of the leadscrew.

3. The valve apparatus of claim 2 wherein the fastener is threadingly engaged with the leadscrew and travels along a length of the leadscrew during rotation of the leadscrew.

4. The valve apparatus of claim 3 further including a lever arm engaging the fastener and the drivegear.

5. The valve apparatus of claim 4 wherein the lever arm includes two parallel arms.

6. The valve apparatus of claim 4 further includes a bushing engaging the fastener and the lever arm.

7. The valve apparatus of claim 1 wherein the drive mechanism includes a motor operatively associated with the leadscrew for selectively rotating the leadscrew in the first or second leadscrew direction.

8. The valve apparatus of claim 7 wherein the drive mechanism further includes a planetary gear transmission operatively associated with the motor.

9. The valve apparatus of claim 8 wherein the planetary gear transmission comprises a central sun gear, a plurality of planetary gears, and a ring gear.

10. The valve apparatus of claim 9 wherein the housing includes a casing defining a cavity, the motor and the planetary gear transmission housed substantially within the cavity.

11. The valve apparatus of claim 9 wherein the drive mechanism further includes a pair of plates and a plurality of shafts securing together the planetary gears, the central sun gear and the ring gear.

12. The valve apparatus of claim 1 further comprising a plurality of pins, each of said leaves being pivotally secured by one of said pins.

13. The valve apparatus of claim 1 wherein the housing defines a bore, the leadscrew, and the drive gear housed substantially within the bore.

14. The valve apparatus of claim 1 wherein the throughhole and the orifice are concentric.

15. A valve apparatus for a fluid transmission line, the valve apparatus comprising:
   a housing;
   a drive mechanism;
   a leadscrew selectively rotatable by the drive mechanism in a first or second leadscrew direction;
   a drive gear mounted to the housing, the drive gear configured to be selectively rotatable in a first or second drive gear direction during rotation of said leadscrew in the first or second leadscrew direction, the drive gear defining a throughhole;

a plurality of leaves disposed about the throughhole, each of said leaves including a curvilinear portion and a pair of ends and being mounted to the drive gear adjacent one of said ends, and each of said leaves being oriented to extend radially inward into said throughhole to define an orifice; and a plurality of engagement members biasing said leaves to reduce the orifice when the drive gear rotates in said first drive gear direction and to increase the orifice when the drive gear rotates in said second drive gear direction to adjust a volume of transmission of fluid therethrough;

a fastener engaged with the leadscrew and with the drive gear for transferring torque from the leadscrew to the drive gear during rotation of the leadscrew, the fastener is threadingly engaged with the leadscrew and travels along a length of the leadscrew during rotation of the leadscrew;

a lever arm engaging the fastener and the drivegear;

a bushing engaging the fastener and the lever arm; and wherein the lever arm includes two parallel arms disposed about the bushing.

16. A valve apparatus for a fluid transmission line, the valve apparatus comprising:

a housing defining a bore and including a motor casing defining a cavity;

a drive mechanism housed substantially within the cavity;

a leadscrew housed substantially within the bore selectively rotatable in a first or second rotational leadscrew direction by the drive mechanism;

a drive gear housed substantially within the bore, the drive gear configured to be selectively rotatable in a first or second drive gear direction during rotation of said leadscrew in the first or second leadscrew direction, said drive gear defining a throughhole;

a fastener housed substantially within the bore, the fastener associated with the drive gear and threadingly engaged with the leadscrew for transferring torque from the leadscrew to the drive gear during rotation of the leadscrew, the fastener configured to travel along a length of the leadscrew during rotation of the leadscrew;

a lever arm housed substantially within the bore engaging the fastener and the drivegear;

a plurality of pins housed substantially within the bore spaced about said throughhole;

a plurality of leaves housed substantially within the bore, each of said leaves including a curvilinear portion and a pair of ends and being pivotally mounted on one of said pins adjacent one of said ends, and each of said leaves being oriented to extend radially inward into said throughhole to define an orifice; and a plurality of engagement members biasing said leaves to reduce the orifice when said drive gear rotates in said first drive gear direction and to increase the orifice when said drive gear rotates in said second drive gear direction to adjust a volume of transmission of fluid therethrough;

wherein the drive mechanism includes a motor operatively associated with the leadscrew for selectively rotating the leadscrew in the first or second leadscrew direction and a planetary gear transmission operatively associated with the motor and with limit switches, the planetary gear transmission comprising a central sun gear, a plurality of planetary gears, and a ring gear.

17. The valve apparatus of claim 16 further comprising a stationary shaft adjacent the leadscrew, the fastener slidably engaged with the shaft for balancing the torque transferred from the leadscrew to the fastener.

18. A valve apparatus for a fluid transmission line, the valve apparatus comprising:

a housing defining a bore and including a motor casing defining a cavity;

a drive mechanism housed substantially within the cavity;

a leadscrew housed substantially within the bore selectively rotatable in a first or second rotational leadscrew direction by the drive mechanism;

a drive gear housed substantially within the bore, the drive gear configured to be selectively rotatable in a first or second drive gear direction during rotation of said leadscrew in the first or second leadscrew direction, said drive gear defining a throughhole;

a fastener housed substantially within the bore, the fastener associated with the drive gear and threadingly engaged with the leadscrew for transferring torque from the leadscrew to the drive gear during rotation of the leadscrew, the fastener configured to travel along a length of the leadscrew during rotation of the leadscrew;

a lever arm housed substantially within the bore engaging the fastener and the drivegear;

a plurality of pins housed substantially within the bore spaced about said throughhole;

a plurality of leaves housed substantially within the bore, each of said leaves including a curvilinear portion and a pair of ends and being pivotally mounted on one of said pins adjacent one of said ends, and each of said leaves being oriented to extend radially inward into said throughhole to define an orifice;

a plurality of engagement members biasing said leaves to reduce the orifice when said drive gear rotates in said first drive gear direction and to increase the orifice when said drive gear rotates in said second drive gear direction to adjust a volume of transmission of fluid therethrough; and a bushing housed substantially within the bore and the lever arm includes two parallel arms disposed about the bushing.

* * * * *